(12) United States Patent
Song

(10) Patent No.: US 7,898,110 B2
(45) Date of Patent: Mar. 1, 2011

(54) ON-LINE UNINTERRUPTIBLE POWER SYSTEM

(75) Inventor: Chen Song, Guangdong Province (CN)

(73) Assignee: Emerson Network Power Energy Systems, North America, Inc., Lorain, OH (US)

( * ) Notice: Subject to any disclaimer, the term of this patent is extended or adjusted under 35 U.S.C. 154(b) by 280 days.

(21) Appl. No.: 11/999,508

(22) Filed: Dec. 5, 2007

(65) Prior Publication Data

US 2009/0179494 A1 Jul. 16, 2009

(30) Foreign Application Priority Data

Jul. 6, 2007 (CN) .......................... 2007 1 0075841

(51) Int. Cl.
*H02J 7/00* (2006.01)
*H02J 9/00* (2006.01)

(52) U.S. Cl. ...................................................... 307/66
(58) Field of Classification Search ................... 307/54, 307/66, 71, 77
See application file for complete search history.

(56) References Cited

U.S. PATENT DOCUMENTS 4,823,247 A * 4/1989 Tamoto ........................ 363/16

6,069,412 A 5/2000 Raddi et al.

FOREIGN PATENT DOCUMENTS

| JP | 5049189 A | 2/1993 |
|----|-----------|--------|
| JP | 9056173 A | 2/1997 |

* cited by examiner

*Primary Examiner*—Jared J Fureman
*Assistant Examiner*—Carlos Amaya
(74) *Attorney, Agent, or Firm*—Harness, Dickey & Pierce, P.L.C.

(57) ABSTRACT

The present invention discloses an on-line uninterruptible UPS system, comprising an AC-DC conversion circuit, a DC-AC conversion circuit and a backup battery circuit, characterized in that the backup battery circuit comprises a battery group and two switch devices, the two switch devices are connected in series, and then connected in parallel with the battery group, the two switch devices are turned on complementarily to each other, the two ends of the battery group are connected to a positive voltage output end and a negative voltage output end respectively, and a neutral line end is connected in between the two switch devices. In the present invention, since two switch devices are connected in series and then in parallel to a battery group, by complementary turning on of the two switch devices, the one battery group can achieve the function of time-sharing operation of two battery groups, such that the number of the batteries in the UPS system can be reduced by half.

10 Claims, 3 Drawing Sheets

ON-LINE UNINTERRUPTIBLE POWER SYSTEM

CROSS-REFERENCE TO RELATED APPLICATIONS

This application claims the benefit of Chinese Patent Application 200710075841.9 filed Jul. 6, 2007. The entire disclosure of the above application is incorporated herein by reference.

Field of the Invention

The present invention relates to power supply technique, and more particularly to an on-line uninterruptible power system (UPS).

Background of the Invention

Generally, an UPS comprises two portions, a main circuit structure and a control circuit structure, as shown in FIG. 1. The main circuit structure of this type of UPS generally comprises three parts. The first part is an AC-DC conversion circuit 10 for converting an AC voltage of the commercial power supply into a DC voltage; the second part is a DC-AC conversion circuit 20 for converting a DC voltage into an AC voltage; and the third is a DC-DC conversion circuit 30 for converting a battery DC voltage into a desired DC voltage. The circuit also comprises energy storage devices C1 and C2, and supplies a positive/negative bus voltage relative to a neutral line to an inverter after energy storage. When a power supply condition of the commercial power is within a predetermined allowable range (a commercial power input mode, i.e., a normal mode), the commercial power supplies the required power for the whole equipment, the AC-DC conversion circuit 10 stores energy in the energy storage devices, and the DC-AC conversion circuit 20 supplies a high quality energy input to a load; when the condition of the commercial power exceeds the allowable range or is in an interrupt state (a battery input mode, i.e., a backup mode), energy is supplied by the battery and stored in the energy storage devices by the DC-DC conversion circuit 30, and the DC-AC conversion circuit 20 provides an uninterruptible power supply to the load.

Since the UPS has a battery input mode, i.e., a backup mode, a backup battery circuit is an issue. The currently common battery circuit generally requires two sets of batteries, of which one set supplies power to the positive bus, and the other set supplies power to the negative bus. Currently, this type of backup battery circuit generally has three connection modes. The first mode is to be connected directly to the positive and negative buses, and supply power directly to the inverter, as shown at position 1 in FIG. 1. This mode has a disadvantage of high battery voltage and large number of batteries. The second mode is to supply power to the inverter after boosting by the DC-DC conversion circuit 30, as shown at position 2 in FIG. 1. This mode has a disadvantage of complex circuit and high cost. The third mode is to share the AC-DC conversion circuit 10 for the commercial power input and the DC-DC conversion circuit 30 for the battery input as much as possible, as shown at position 3 in FIG. 1.

It is an object of the UPS manufacturers to reduce the voltage of the batteries and decrease the number of the batteries without increasing the cost and affecting the performance as much as possible. Therefore, it is a technical problem to be solved at present to decrease the number of batteries in the UPS system of the prior art.

SUMMARY OF THE INVENTION

The object of the present invention is to provide an UPS system comprising a backup battery circuit which enables to achieve the function of time-sharing operation of two battery groups using one battery group, such that the number of the batteries in the backup battery circuit can be reduced by half.

The on-line uninterruptible UPS system according to the present invention comprises an AC-DC conversion circuit, a DC-AC conversion circuit and a backup battery circuit, wherein the backup battery circuit comprises a battery group and two switch devices, the two switch devices are connected in series, and then connected in parallel with the battery group, the two switch devices are turned on complementarily to each other, the two ends of the battery group are connected to a positive voltage output end and a negative voltage output end respectively, and a neutral line end is connected in between the two switch devices.

An isolator is connected in series in the backup battery circuit. The isolator can isolate the battery circuit from other circuits so as to protect the battery.

The isolator is connected in series to the positive or negative end of the battery group, and then the serially connected isolator and the battery group are connected in parallel with the serially connected two switch devices. This is one series connection mode of the isolator.

The isolator is connected in series to the positive output end or the negative output end of the backup battery circuit. This is one series connection mode of the isolator.

The positive output end and the negative output end of the backup battery circuit are each connected to one isolator in series, respectively. Different isolating mode can be used in different application.

The positive voltage output end and the negative voltage output end of the backup battery circuit are connected to the corresponding positive and negative input ends of the DC-AC conversion circuit via the isolators, and the neutral line end thereof is connected directly to the neutral line of the input ends of the DC-AC conversion circuit. Thus, energy can be supplied directly to the DC-AC conversion circuit.

The on-line uninterruptible UPS system comprises a DC-DC conversion circuit, and the positive voltage output end, the negative voltage output end and the neutral line end of the backup battery circuit are connected directly to the positive and negative input ends and the neutral line of the DC-DC conversion circuit. Thus, energy is supplies to the inverter after boosting by the DC-DC conversion circuit.

The positive voltage output end, the negative voltage output end and the neutral line end of the backup battery circuit are connected directly to the positive and negative input ends and the neutral line of the AC-DC conversion circuit. Thus the AC-DC conversion circuit for the commercial power input and the DC-DC conversion circuit for the battery input can be shared.

The AC-DC conversion circuit comprises a rectifier circuit and a DC-DC conversion circuit, wherein the two ends of the commercial power are connected to the input ends of the rectifier circuit, the positive and negative output ends and the neutral line end of the rectifier circuit are connected to the positive voltage output end, the negative voltage output end and the neutral line end of the backup battery circuit respectively, and the positive voltage output end, the negative voltage output end and the neutral line end of the backup battery circuit are connected to the positive and negative input ends and the neutral line end of the DC-DC conversion circuit respectively. The AC-DC conversion circuit for the commercial power input and the DC-DC conversion circuit for the battery input can be shared in such a circuit. The combination of the voltage doubling rectifier circuit for the commercial power and the successive DC-DC conversion circuit corresponds to an AC-DC conversion circuit of the prior art.

An isolator is provided between the positive or negative output end of the rectifier circuit and the positive or negative input end of the DC-DC conversion circuit. The isolator can isolate the rectifier circuit and the DC-DC conversion circuit from other circuits.

In the present invention, since two switch devices are connected in series and then in parallel to a battery group, by complementary turning on of the two switch devices, the one battery group can achieve the function of time-sharing operation of two battery groups, such that the number of the batteries in the backup battery circuit can be reduced by half.

DESCRIPTION OF THE PREFERRED EMBODIMENTS

Embodiment 1

Figure 1:
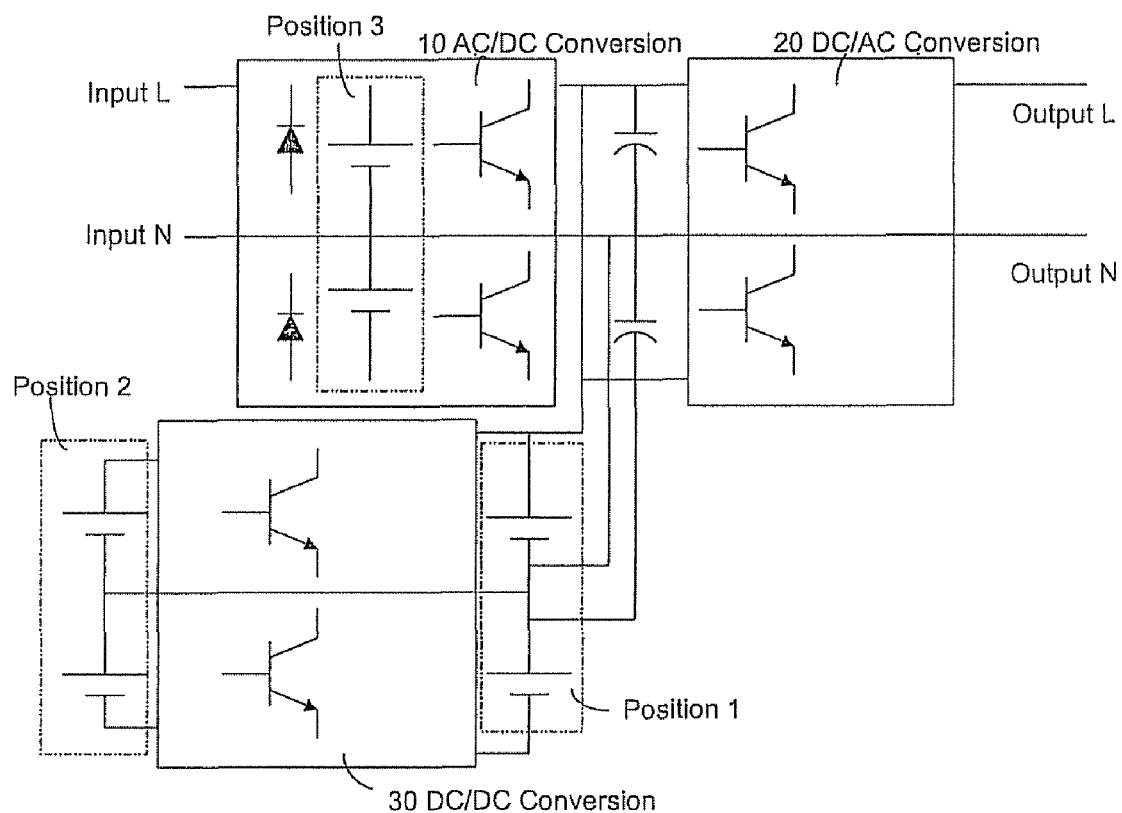
FIG. 1 is a block diagram showing the main circuit of a UPS of the prior art.
Figure 2:
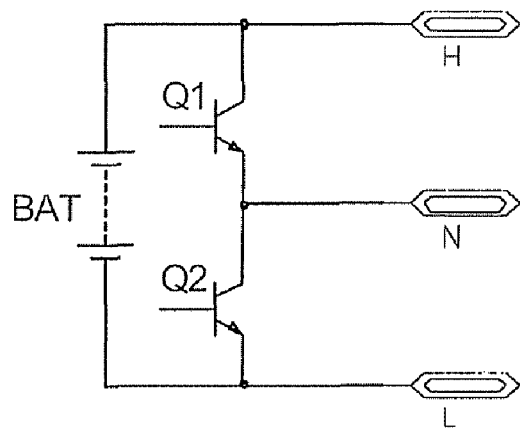
FIG. 2 is a circuit diagram showing the backup battery circuit according to embodiment 1.
Figure 3:
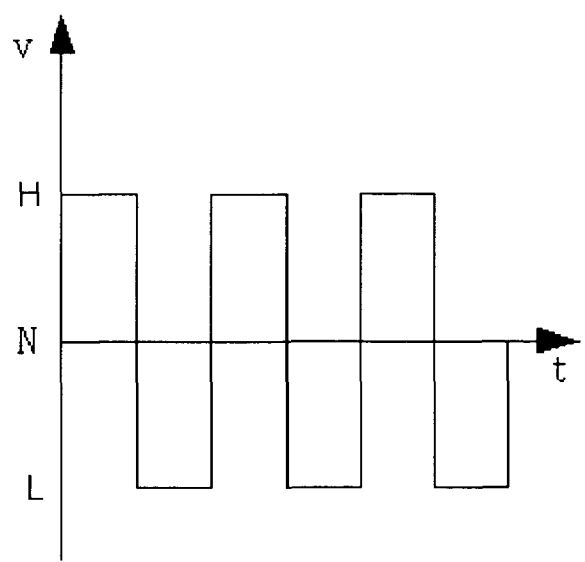
FIG. 3 is a graph showing a waveform of the output voltage of the backup battery circuit of FIG. 2.
Figure 4:
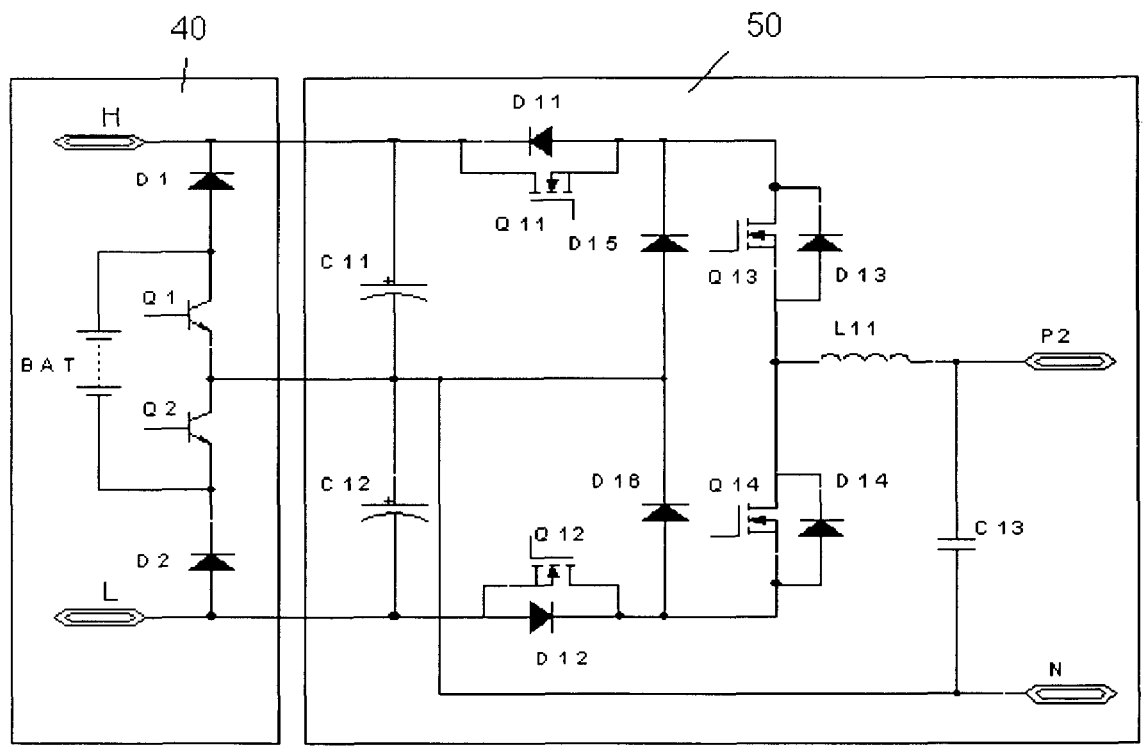
FIG. 4 is a circuit diagram showing that the backup battery circuit is connected to the input end of the DC-AC conversion circuit according to embodiment 1 of the present invention.

Refer to FIGS. 2, 3 and 4.

In FIG. 3, the abscissa represents time, and the ordinate represents a voltage.

The on-line uninterruptible UPS system according to the present embodiment comprises an AC-DC conversion circuit, a DC-AC conversion circuit and a backup battery circuit. The backup battery circuit comprises a battery group BAT and two switch devices Q1 and Q2, wherein the two switch devices Q1 and Q2 are connected in series, and then connected in parallel with the battery group BAT, the two switch devices Q1 and Q2 are turned on complementarily to each other, the two ends of the battery group BAT are connected to a positive voltage output end and a negative voltage output end via diodes D1 and D2 respectively, and a neutral line end is connected in between the two switch devices. Herein the diodes D1 and D2 function as isolators.

The DC-AC conversion circuit comprises charging capacitors C11 and C12, a capacitor C13, switch devices Q11, Q12, Q13 and Q14, diodes D15 and 16, and an inductor L11. This is a well known DC-AC conversion circuit in the art, of which the connection relationship is as shown in the figure, and a detailed description is herein omitted. The positive voltage output end, the negative voltage output end and the neutral line end of the backup battery circuit are connected directly to the corresponding positive and negative buses and the neutral line of the input ends of the DC-AC conversion circuit.

The present embodiment does not adopt a DC-DC conversion circuit, but includes an AC-DC conversion circuit which is not shown in the figure. The output ends of the AC-DC conversion circuit are connected to the input ends of the DC-AC conversion circuit. During an operation in the battery input mode, i.e., the backup mode, the backup battery circuit supplies energy directly to the DC-AC conversion circuit.

Embodiment 2

Figure 5:
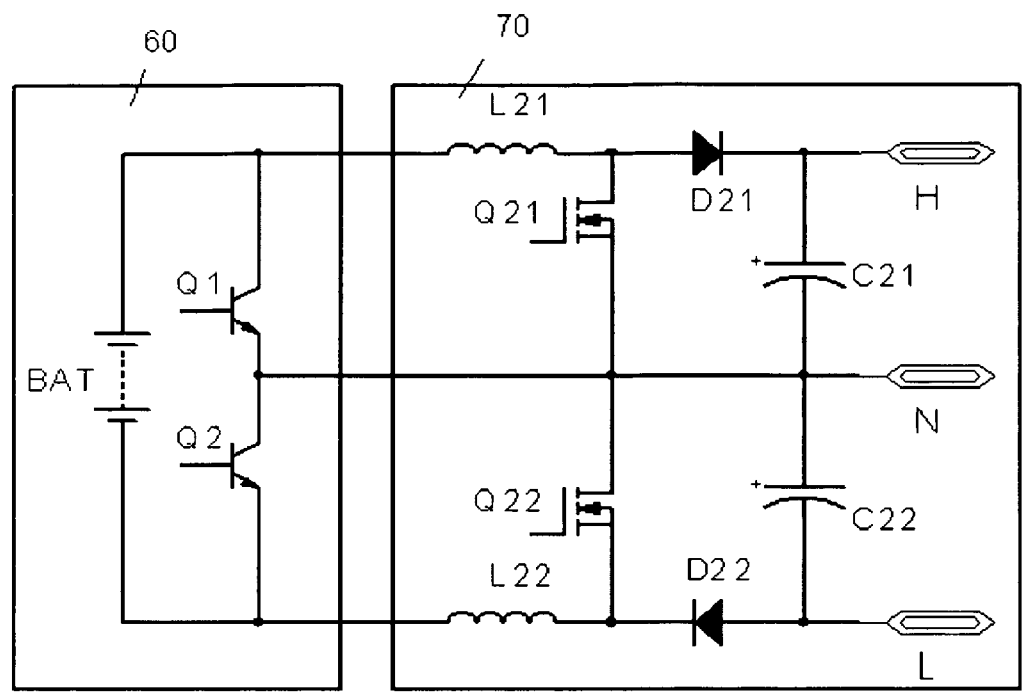
FIG. 5 is a circuit diagram showing that the backup battery circuit is connected to the input end of the DC-DC conversion circuit according to embodiment 2 of the present invention.

Referring to FIG. 5, block 60 represents a backup battery circuit, and block 70 represents a DC-DC conversion circuit.

The on-line uninterruptible UPS system according to the present embodiment comprises an AC-DC conversion circuit, a DC-AC conversion circuit, a DC-DC conversion circuit and a backup battery circuit. The backup battery circuit comprises a battery group BAT and two switch devices Q1 and Q2, wherein the two switch devices Q1 and Q2 are connected in series, and then connected in parallel with the battery group BAT, the two switch devices Q1 and Q2 are turned on complementarily to each other. The two ends of the battery group BAT are connected to a positive voltage output end and a negative voltage output end respectively, and a neutral line end is connected in between the two switch devices.

The DC-DC conversion circuit comprises switch devices Q21 and Q22, diodes D21 and D22, charging capacitors C21 and C22, and inductors L21 and L22. This is a well known dual DC-DC conversion circuit in the art, of which the connection relationship is as shown in the figure, and a detailed description is herein omitted. The positive voltage output end, the negative voltage output end and the neutral line end of the backup battery circuit are connected directly to the corresponding positive and negative buses and the neutral line of the input ends of the DC-DC conversion circuit.

Essentially, the backup battery circuit is connected to the input ends of the DC-DC conversion circuit in the present embodiment. During an operation in the battery input mode, i.e., the backup mode, the backup battery circuit supplies energy to the inverter (i.e., the DC-AC conversion circuit) after boosting by the DC-DC conversion circuit. The AC-DC conversion circuit and the DC-AC conversion circuit are not shown in the figure. The output ends of the AC-DC conversion circuit are connected to the input ends of the DC-AC conversion circuit, and the output ends of the aforesaid dual DC-DC conversion circuit are connected to the input ends of the DC-AC conversion circuit.

Embodiment 3

Figure 6:
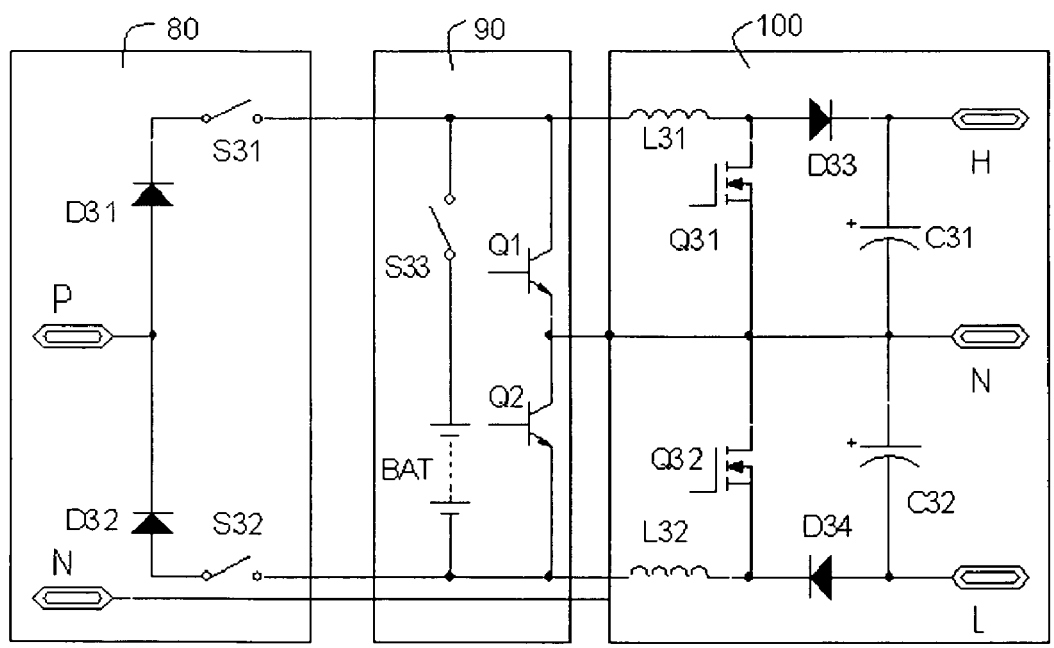
FIG. 6 is a circuit diagram showing that the backup battery circuit is connected to the input end of the AC-DC conversion circuit according to embodiment 3 of the present invention.

Referring to FIG. 6, block 80 represents a voltage doubling rectifier circuit for the commercial power, block 90 represents a backup battery circuit, and block 100 represents a dual DC-DC conversion circuit.

The on-line uninterruptible UPS system according to the present embodiment comprises a rectifier circuit, a backup battery circuit, a DC-DC conversion circuit, and a DC-AC conversion circuit. The backup battery circuit comprises a battery group BAT and two switch devices Q1 and Q2, wherein the battery group BAT is connected with an isolator S33 in series, the two switch devices Q1 and Q2 are connected in series, and the serially connected isolator S33 and battery group BAT are then connected in parallel with the serially connected two switch devices Q1 and Q2. The two switch devices Q1 and Q2 are turned on complementarily to each other. The two ends of the series circuit consisting of battery group BAT and isolator S33 are connected to a positive voltage output end and a negative voltage output end respectively, and a neutral line end is connected in between the two switch devices. The isolator S33 is connected to the positive pole of the battery group BAT in series, as shown in the figure. However, it may also be connected to the negative pole of the battery group BAT, or the positive or negative output end of the backup battery circuit. Also, an isolator may be connected in series to each of the positive output end and the negative output end of the backup battery circuit respectively. The isolator may isolate the backup battery circuit from the system when necessary so as to protect the battery.

The rectifier circuit consists of two serially connected rectifier diodes D31 and D32. A live line of the commercial power is connected in between the diodes D31 and D32, and a zero line of the commercial power is connected to the neutral line. The diodes D31 and D32 are connected to the positive voltage output end and the negative voltage output end of the backup battery circuit via static transfer switches (isolator) S31 and S32, respectively.

The DC-DC conversion circuit comprises switch devices Q31 and Q32, diodes D31 and D32, charging capacitors C31 and C32, and inductors L31 and L32. This is a well known dual DC-DC conversion circuit in the art, of which the connection relationship is as shown in the figure, and a detailed description is herein omitted. Its structure may be identical with that of the DC-DC conversion circuit shown in FIG. 5. The positive voltage output end, the negative voltage output end and the neutral line end of the backup battery circuit are connected directly to the corresponding positive and negative buses and the neutral line of the input ends of the dual DC-DC conversion circuit. The output ends of the DC-DC conversion circuit are connected to the input ends of the DC-AC conversion circuit (not shown in the figure).

The circuit according to the present embodiment can share the AC-DC conversion circuit for the commercial power input and the DC-DC conversion circuit for the battery input. The combination of the rectifier circuit with the successive DC-DC conversion circuit corresponds to an AC-DC conversion circuit of the prior art, and the combination of the backup battery circuit with the successive DC-DC conversion circuit corresponds to a DC-DC conversion circuit of the prior art.

The invention claimed is:

1. An on-line uninterruptible UPS system, comprising an AC-DC conversion circuit, a DC-AC conversion circuit and a backup battery circuit, characterized in that the backup battery circuit comprises one battery group and two switch devices, the two switch devices are connected in series, and then connected in parallel with the one battery group, the two switch devices are turned on complementarily to each other, the two ends of the one battery group are connected to a positive voltage output end and a negative voltage output end respectively, and a neutral line end is connected in between the two switch devices, wherein the backup battery circuit is operative to supply a voltage of the one battery group between the positive voltage output end and the neutral line when one of the two switch devices is turned on, and to supply the voltage of the one battery group between the negative voltage output end and the neutral line when the other of the two switch devices is turned on.

2. An on-line uninterruptible UPS system according to claim 1, characterized in that an isolator is connected in series in the backup battery circuit.

3. An on-line uninterruptible UPS system according to claim 2, characterized in that the isolator is connected in series to the one battery group, and then the serially connected isolator and the one battery group are connected in parallel with the serially connected two switch devices.

4. An on-line uninterruptible UPS system according to claim 2, characterized in that the isolator is connected in series to the positive output end or the negative output end of the backup battery circuit.

5. An on-line uninterruptible UPS system according to claim 2, characterized in that the positive output end and the negative output end of the backup battery circuit are each connected to one isolator in series, respectively.

6. An on-line uninterruptible UPS system according to claim 2, characterized in that the positive voltage output end and the negative voltage output end of the backup battery circuit are connected to the corresponding positive and negative input ends of the DC-AC conversion circuit via the isolators, and the neutral line end thereof is connected directly to the neutral line of the input ends of the DC-AC conversion circuit.

7. An on-line uninterruptible UPS system according to claim 2, characterized in that the positive voltage output end, the negative voltage output end and the neutral line end of the backup battery circuit are connected directly to the positive and negative input end and the neutral line of the input ends of the AC-DC conversion circuit.

8. An on-line uninterruptible UPS system according to claim 7, characterized in that the AC-DC conversion circuit comprises a rectifier circuit and a DC-DC conversion circuit, the two ends of the commercial power are connected to the input ends of the rectifier circuit, the positive and negative output ends and the neutral line end of the rectifier circuit are connected to the positive voltage output end, the negative voltage output end and the neutral line end of the backup battery circuit respectively, and the positive voltage output end, the negative voltage output end and the neutral line end of the backup battery circuit are connected to the positive and negative input ends and the neutral line end of the DC-DC conversion circuit respectively.

9. An on-line uninterruptible UPS system according to claim 8, characterized in that an isolator is provided between the positive or negative output end of the rectifier circuit and the positive or negative input end of the DC-DC conversion circuit.

10. An on-line uninterruptible UPS system according to claim 1, characterized in that the on-line uninterruptible UPS system comprises a DC-DC conversion circuit, and the positive voltage output end, the negative voltage output end and the neutral line end of the backup battery circuit are connected directly to the positive and negative input ends and the neutral line of the input ends of the DC-DC conversion circuit.

* * * * *

UNITED STATES PATENT AND TRADEMARK OFFICE
CERTIFICATE OF CORRECTION

Page 1 of 1

| | |
|---|---|
| PATENT NO. | : 7,898,110 B2 |
| APPLICATION NO. | : 11/999508 |
| DATED | : March 1, 2011 |
| INVENTOR(S) | : Chen Song |

It is certified that error appears in the above-identified patent and that said Letters Patent is hereby corrected as shown below:

Column 2, line 2, "enables" should be --enables one battery group--.

Column 2, line 6, delete "using one battery group".

Column 2, line 32, "mode" should be --modes--.

Column 2, line 33 "application" should be --applications--.

Column 2, line 47, "supplies" should be --supplied--.

Column 5, line 25, "Fig. 5" should be --Fig. 3--.

Signed and Sealed this
Twenty-fourth Day of January, 2012

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,898,110 B2 |
| APPLICATION NO. | : 11/999508 |
| DATED | : March 1, 2011 |
| INVENTOR(S) | : Chen Song |

It is certified that error appears in the above-identified patent and that said Letters Patent is hereby corrected as shown below:

Title page, (73) Assignee: Emerson Network Power Energy Systems, North America, Inc., Lorain, OH should be --Emerson Network Power Co., Ltd., Nanshan District, Shenzhen, China--.

Signed and Sealed this
Thirteenth Day of March, 2012

David J. Kappos
*Director of the United States Patent and Trademark Office*